United States Patent
Kitazaki et al.

(10) Patent No.: US 7,977,270 B2
(45) Date of Patent: *Jul. 12, 2011

(54) PHOTOCATALYST-COATED BODY AND PHOTOCATALYTIC COATING LIQUID THEREFOR

(75) Inventors: Satoru Kitazaki, Hiratsuka (JP); Junji Kameshima, Fujisawa (JP); Koji Omoshiki, Chigasaki (JP); Yoji Takaki, Chigasaki (JP); Yuki Tanaka, Chigasaki (JP); Hironaga Iwata, Chigasaki (JP); Makoto Hayakawa, Chigasaki (JP); Mitsuyoshi Kanno, Chigasaki (JP)

(73) Assignee: Toto Ltd., Fukuoka-ken (JP)

( * ) Notice: Subject to any disclaimer, the term of this patent is extended or adjusted under 35 U.S.C. 154(b) by 192 days.

This patent is subject to a terminal disclaimer.

(21) Appl. No.: 12/079,417

(22) Filed: Mar. 26, 2008

(65) Prior Publication Data

US 2008/0254975 A1 Oct. 16, 2008

(30) Foreign Application Priority Data

Mar. 26, 2007 (JP) ................................. 2007-079469
May 11, 2007 (JP) ................................. 2007-127296

(51) Int. Cl.
*B01J 31/06* (2006.01)
(52) U.S. Cl. ..................................................... 502/159
(58) Field of Classification Search .................... None
See application file for complete search history.

(56) References Cited

U.S. PATENT DOCUMENTS

| | | | |
|---|---|---|---|
| 5,616,532 A * | 4/1997 | Heller et al. | 502/242 |
| 6,013,372 A | 1/2000 | Hayakawa et al. | |
| 6,071,606 A * | 6/2000 | Yamazaki et al. | 428/325 |
| 6,221,498 B1 | 4/2001 | Takahama et al. | |
| 6,228,480 B1 | 5/2001 | Kimura et al. | |
| 6,491,883 B2 | 12/2002 | Mori et al. | |
| 6,906,001 B1 | 6/2005 | Escaffre et al. | |
| 2005/0277543 A1 | 12/2005 | Takahashi et al. | |

(Continued)

FOREIGN PATENT DOCUMENTS

JP 11-140432 5/1999

(Continued)

OTHER PUBLICATIONS

Nissan Chemical America Corporation, Technical information on Snowtex 50, http://www.nissanchem-usa.com/snowtex.php., pp. 1-9.

(Continued)

*Primary Examiner* — Melvin C Mayes
*Assistant Examiner* — Stefanie Cohen
(74) *Attorney, Agent, or Firm* — Carrier, Blackman & Associates PC; Joseph P. Carrier; William D. Blackman

(57) ABSTRACT

There is disclosed a photocatalyst-coated body which is superior in weather resistance, noxious gas decomposability, and various coating properties (such as ultraviolet absorptivity, transparency and film strength) while preventing corrosion of a substrate (in particular an organic substrate), and a photocatalyst coating liquid therefor. The photocatalyst-coated body comprises a substrate and a photocatalyst layer provided on the substrate. The photocatalyst layer comprises photocatalyst particles of 1 part or more by mass and less than 20 parts by mass; inorganic oxide particles of 70 parts or more by mass and less than 99 parts by mass; and a hydrolyzable silicone of zero parts or more by mass and less than 10 parts by mass, provided that a total amount of the photocatalyst particles, the inorganic oxide particles and the hydrolyzable silicone is 100 parts by mass.

20 Claims, 3 Drawing Sheets

U.S. PATENT DOCUMENTS

2006/0020052 A1* 1/2006 Tsujimoto et al. .............. 522/71
2006/0264525 A1* 11/2006 Ohwaki et al. .................. 522/18

FOREIGN PATENT DOCUMENTS

| JP | 11-169727 | | 6/1999 |
|---|---|---|---|
| JP | 2001-152051 | A | 6/2001 |
| JP | 2001-179091 | A | 7/2001 |
| JP | 2001-232215 | A | 8/2001 |
| JP | 2002-053772 | A | 2/2002 |
| JP | 2004-359902 | | 12/2004 |
| JP | 2005-082637 | | 3/2005 |
| JP | 2005-082637 | A | 3/2005 |
| JP | 2005-179686 | | 7/2005 |
| JP | 2005-199607 | A | 7/2005 |
| JP | 2006-045419 | A | 2/2006 |
| JP | 2006-111680 | A | 4/2006 |
| JP | 2007-055207 | A | 3/2007 |
| JP | 2008-264747 | | 11/2008 |
| JP | 2008-264777 | | 11/2008 |
| WO | WO 97/00134 | | 1/1997 |
| WO | 03/033144 | A1 | 4/2003 |

OTHER PUBLICATIONS

Nihon Parkerrizing Co., Ltd., Photocatalyst Coating Material (Paltitan Series), pp. 1-4., http://www.technopedia.jp/list/enseeds/e 093.html.

Isihara Sangyo Co., Technological Information on STS-21, Photocatalytic Titanium Dioxide, http://www20.inetba.com/ishiharacorpusa/item416092.ctlg.

Tayca Corp Technology, Photocatalystic Titanium Dioxide, pp. 1-2, http://tayca.co.jp/english/file/04/08 03.html.

* cited by examiner

PHOTOCATALYST-COATED BODY AND PHOTOCATALYTIC COATING LIQUID THEREFOR

CROSS-REFERENCE TO RELATED APPLICATIONS

The present application claims priority from Japanese patent applications 2007-79469 filed 26 Mar. 2007 and 2007-127296 filed 11 May 2007. The entire disclosure of each of the referenced priority documents is incorporated herein by reference.

TECHNICAL FIELD

The present invention relates to a photocatalyst-coated body which is superior in weather resistance, noxious gas decomposability, and various coating properties, particularly suitable for use in exterior materials for buildings and the like. The present invention also relates to a photocatalyst coating liquid for the photocatalyst-coated body.

BACKGROUND ART

Photocatalysts such as titanium oxide have been recently utilized in various applications such as exterior materials for buildings. Employment of the photocatalyst makes it possible to harness light energy to decompose various types of noxious substances and to hydrophilize the surface of a substrate coated with the photocatalyst to allow a stain deposited on the surface to be easily washed away with water. The following techniques have been known for producing photocatalyst-coated bodies coated with such a photocatalyst.

It is known to use an aqueous dispersion comprising photocatalytic metallic oxide particles, a colloidal silica, and a surfactant to impart hydrophilic properties to the surface of a synthetic resin or the like (see, for example, Japanese Patent Laid-Open Publication No. 1999-140432). In this technique, the hydrophilic properties are intensified by adding a large amount of a surfactant ranging from 10 wt % to 25 wt %. Also, the film thickness is set at 0.4 μm or less in order to prevent white turbidity from being caused by diffuse reflection of light.

It is also known to form on the substrate a coating film comprising a photocatalytic titanium dioxide and a binder silica sol to obtain a photocatalyst body (see, for example, Japanese Patent Laid-Open No. 1999-169727). In this technique, the additive amount of the silica sol in view of $SiO_2$ is 20 parts to 200 parts by weight of the titanium dioxide, and the $TiO_2$ content ratio is high. The particle diameter of the silica sol is as small as 0.1 nm to 10 nm.

It is also known that a photocatalyst coating material is used to form a photocatalyst coating film that transmits 50% or more of light having a wavelength of 500 nm and blocks 80% or more of light having a wavelength of 320 nm (see, for example, in Japanese Patent Laid-Open No. 2004-359902). In this technique, an organosiloxane partial hydrolysate is used as a binder of the photocatalyst coating material, in which the organosiloxane partial hydrolysate is contained preferably in an amount of 5 mass % to 40 mass % of the entire coating composition.

In the meantime, a problem has been conventionally known that, when a substrate for a photocatalyst layer is composed of an organic material, the organic material is decomposed or deteriorated due to photocatalytic activity of the photocatalyst. In order to address this problem, it is known that an adhesive layer made of a silicone-modified resin or the like is provided between a photocatalyst layer and a substrate to protect the substrate from being deteriorated by the photocatalysis (see, for example, WO97/00134).

SUMMARY OF THE INVENTION

The inventors have currently found that a photocatalyst-coated body which is superior in weather resistance, noxious gas decomposability, and various coating properties (such as ultraviolet absorptivity, transparency and film strength) can be obtained while preventing corrosion of a substrate (in particular an organic substrate), by constituting a photocatalyst layer with a specified composition that comprises photocatalyst particles and inorganic oxide particles in a specified mass ratio and minimizing a hydrolyzable silicone and a surfactant to no or a small amount.

Accordingly, it is an object of the present invention to provide a photocatalyst-coated body which is superior in weather resistance, noxious gas decomposability, and various coating properties (such as ultraviolet absorptivity, transparency and film strength) while preventing corrosion of a substrate (in particular an organic substrate). It is also an object of the present invention to provide a photocatalyst coating liquid for the photocatalyst-coated body.

According to an aspect of the present invention, there is provided a photocatalyst-coated body comprising a substrate and a photocatalyst layer provided on the substrate, the photocatalyst layer comprising:

photocatalyst particles of 1 part or more by mass and less than 20 parts by mass;

inorganic oxide particles of 70 parts or more by mass and less than 99 parts by mass; and a hydrolyzable silicone of zero parts or more by mass and less than 10 parts by mass, provided that a total amount of the photocatalyst particles, the inorganic oxide particles and the hydrolyzable silicone is 100 parts by mass.

According to another aspect of the present invention, there is provided a photocatalyst coating liquid used for manufacturing the photocatalyst-coated body, comprising, in a solvent, photocatalyst particles of 1 part or more by mass and less than 20 parts by mass;

inorganic oxide particles of 70 parts or more by mass and less than 99 parts by mass; and a hydrolyzable silicone of zero parts or more by mass and less than 10 parts by mass, provided that the total amount of the photocatalyst particles, the inorganic oxide particles and the hydrolyzable silicone is 100 parts by mass.

DETAILED DESCRIPTION OF THE INVENTION

Photocatalyst-Coated Body

Figure 1:
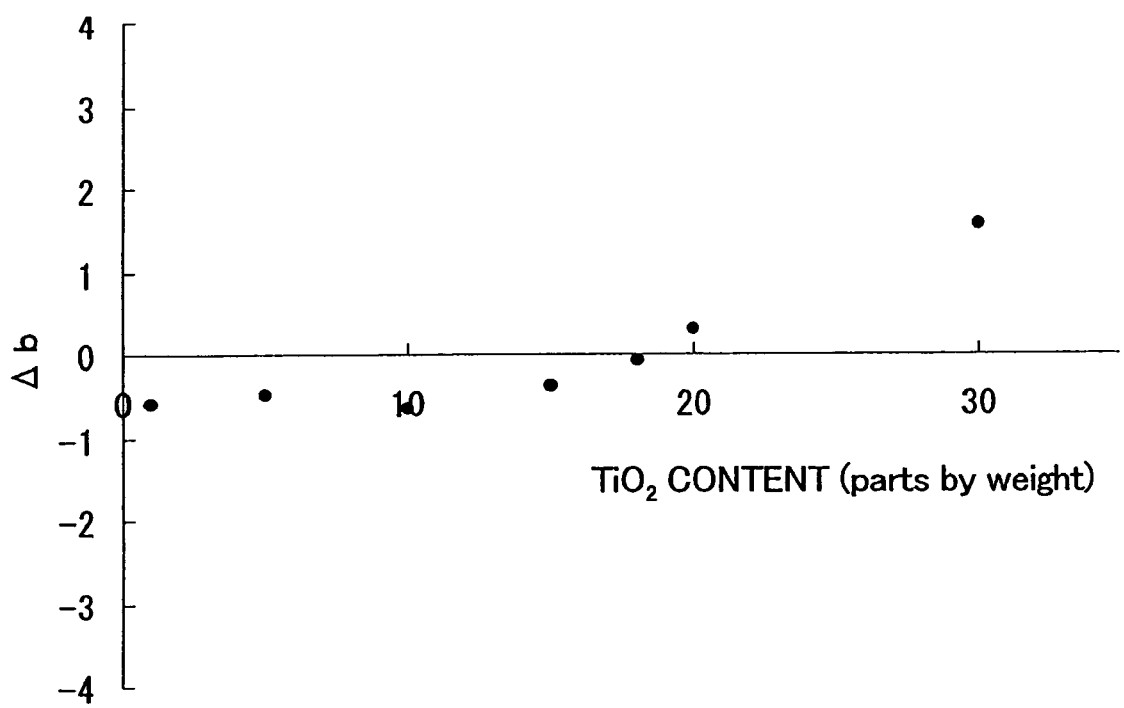
FIG. 1 is a graph showing the relationship between the values Δb being a change in color difference between before and after the accelerated test and $TiO_2$ content ratios, measured in Examples 1 to 7, in which the values of the $TiO_2$ content ratios (parts by mass) represent the proportion of the mass of the titanium oxide particles to the total amount of the titanium oxide particles and the silica particles.

The photocatalyst-coated body according to the present invention comprises a substrate and a photocatalyst layer provided on the substrate. The photocatalyst layer includes 1 part or more and less than 20 parts by mass of photocatalyst particles, 70 parts or more and less than 99 part by mass of inorganic oxide particles, zero parts or more and less than 10 parts by mass of a hydrolyzable silicone as an optional component, and zero parts or more and less than 10 parts by mass of a surfactant as an optional component. The total amount of the photocatalyst particles, the inorganic oxide particles, and the hydrolyzable silicone is 100 parts by mass, and the parts by mass of the surfactant are determined with respect to the total 100 parts by mass.

The photocatalyst layer according to the present invention basically comprises 1 part or more and less than 20 parts by mass of photocatalyst particles and 70 parts or more and less than 99 parts by mass of inorganic oxide particles. This constitution makes it possible to achieve a photocatalyst-coated body which is superior in weather resistance, noxious gas decomposability, and various coating properties (such as ultraviolet absorptivity, transparency and film strength) while preventing corrosion of a substrate (in particular an organic substrate). The reason why these effects are realized all together is not clear, but may be supposed to be as follows. The following explanation is only a hypothesis, and the present invention is not limited by the following hypothesis. First, since the photocatalyst layer basically comprises two kinds of particles, i.e., the photocatalyst particles and the inorganic oxide particles, there is a lot of space between the particles. In the case of using a large amount of a hydrolyzable silicone widely used as a binder for a photocatalyst layer, it is considered that the hydrolyzable silicone would block diffusion of the gas because the space between particles is closely filled up. However, the photocatalyst layer of the present invention is free from a hydrolyzable silicone or, in the alternative, comprises the hydrolyzable silicone of less than 10 parts by mass with respect to the total 100 parts by mass of the photocatalyst particles, the inorganic oxide particles and the hydrolyzable silicone. For this reason, it is supposed that the space between particles can be sufficiently ensured. The space thus ensured leads to realization of a structure in which noxious gases such as NOx and SOx are readily diffused into the photocatalyst layer. As a result, it is supposed that the noxious gases come into effective contact with the photocatalyst particles to be decomposed by the photocatalyst activity.

At the same time, it is considered that, since the proportion of the photocatalyst particles is quite lower than that of the inorganic oxide particles, direct contact of the photocatalyst particles with the substrate can be minimized to suppress corrosion of the substrate (in particular the organic substrate). It is also supposed that the substrate can be prevented from being damaged from ultraviolet light because the photocatalyst itself absorbs ultraviolet light to reduce the amount of ultraviolet light reaching the substrate. As a result, the photocatalyst layer of the present invention is able to be formed on a substrate of which at least the surface is composed of an organic material, by direct application without interposing an intermediate layer for protecting the substrate. Thus, since there is no necessity to form the intermediate layer, it is possible to save time and cost required for manufacturing photocatalyst-coated bodies. In addition, the photocatalyst layer of the present invention may not comprise a surfactant, but even if the photocatalyst layer comprises the surfactant, the amount of surfactant is set to less than 10 parts by mass with respect to the total 100 parts by mass of the photocatalyst particles, the inorganic oxide particles and the hydrolyzable silicone. By this setting, it is supposed to prevent deterioration in film strength and noxious gas decomposability, which is caused by a large amount of the surfactant being contained. With the above various phenomena occurring all together, it is thought to achieve a photocatalyst-coated body which is superior in weather resistance, noxious gas decomposability, and various coating properties (such as ultraviolet absorptivity, transparency and film strength) while preventing corrosion of a substrate (in particular an organic substrate).

Substrate

The substrate usable in the present invention may be various materials on which the photocatalyst layer can be formed, regardless of an organic material or an inorganic material, and the shape of the substrate is not limited. Preferable examples of substrates in view of material include metals, ceramics, glasses, plastics, rubbers, stones, cements, concretes, fibers, fabrics, woods, papers, combinations of these, laminations of these, and ones having at least one coated layer on the surface of these. Preferable examples of substrates in view of application include building materials; building exterior materials; window frames; window glasses; structural members; exterior components and coating of vehicles; exterior components of machines; apparatus and goods; dustproof masks and coating; traffic signs; various types of displays; advertising pillars; road sound barriers; railway sound barriers; bridges; exterior components and coating of crash barriers; inner walls and coating of tunnels; insulators; solar cell covers; heat-collecting covers for solar water heaters; plastic greenhouses; vehicle lamp covers; outdoor lighting apparatus; pedestals; and various exterior materials such as films, sheets and seals to be attached to the surfaces of the above articles.

According to a preferred aspect of the present invention, the substrate may have at least the surface composed of an organic material, and include a substrate entirely made of an organic material and a substrate made of an inorganic material of which the surface is covered with an organic material (e.g., decorative plate). According to the photocatalyst layer of the present invention, corrosion does not easily occur in an organic material, which is sensitive to the photocatalyst activity, a photocatalyst-coated body having superior functions can be produced by use of the photocatalyst layer alone without an intermediate layer. As a result, since there is no necessity to form the intermediate layer, it is possible to save time and cost required for manufacturing photocatalyst-coated bodies.

Photo-Crystal Layer and Photo-Crystal Coating Liquid for Forming it

The photocatalyst layer according to the present invention comprises 1 part or more and less than 20 parts by mass of photocatalyst particles, 70 parts or more and less than 99 part by mass of inorganic oxide particles, zero parts or more and less than 10 parts by mass of a hydrolyzable silicone, and zero parts or more and less than 10 parts by mass of a surfactant. The total amount of the photocatalyst particles, the inorganic oxide particles and the hydrolyzable silicone is 100 parts by mass. The photocatalyst layer can be formed by coating the substrate with a photocatalyst coating liquid comprising a solvent and a solute comprising the above-described constituents in the above-described mass ratio dispersed in the solvent.

According to a preferred aspect of the present invention, the film thickness of the photocatalyst layer is preferably 0.5 µm to 3.0 µm, more preferably 1.0 µm to 2.0 µm. Within this film-thickness range, ultraviolet light reaching the interface between the photocatalyst layer and the substrate is sufficiently attenuated, leading to an improvement in weather resistance. In addition, it is possible to increase the amount of photocatalyst particles positioned in the film-thickness direction although the content ratio of the photocatalyst particle is lower than that of the inorganic oxide particles, resulting in an improvement in noxious gas decomposability. Further, superior properties in ultraviolet absorptivity, transparency and film strength can be provided.

The photocatalyst particles usable in the present invention are not particularly limited as far as they have photocatalyst activity, and particles of various types of photocatalysts can be used. Examples of the photocatalyst particles include metal-oxide particles such as particles of titanium oxide ($TiO_2$), ZnO, $SnO_2$, $SrTiO_3$, $WO_3$, $Bi_2O_3$, and $Fe_2O_3$, preferably titanium oxide particles, more preferably anatase titanium oxide particles. The titanium oxide is harmless, chemically stable and available in low cost. Because of its high band gap energy, the titanium oxide needs ultraviolet light for photoexcitation and does not absorb visible light in the process of the photoexcitaiton. As a result, coloration by complementary color components does not occur. The titanium oxide is available in various forms such as powder, sol, and solution. Any form of titanium oxide may be employed as far as it exhibits photocatalyst activity. According to a preferred aspect of the present invention, the photocatalyst particles preferably have an average particle size of 10 nm to 100 nm, more preferably 10 nm to 60 nm. The average particle size is calculated as a number average value obtained by measuring the lengths of 100 particles randomly selected from the particles located within a visible field magnified 200,000 times by a scanning electron microscope. The most suitable shape of the particle is a perfect sphere, but an approximately round or elliptical particle may be employed, in which case the length of the particle is approximately calculated as ((long diameter+short diameter)/2). Within this range, the weather resistance, the noxious gas decomposability, and the desired coating properties (such as ultraviolet absorptivity, transparency and film strength) are effectively exhibited. When a commercially available photocatalyst of sol form is used and processed so that the particle diameter becomes 30 nm or less, preferably 20 nm or less, it is also possible to produce a photocatalyst layer with especially high transparency.

The content of the photocatalyst particles in the photocatalyst layer or the coating liquid of the present invention is 1 part or mote and less than 20 parts by mass, preferably 5 parts to 15 parts by mass, more preferably 5 parts to 10 parts by mass with respect to the total 100 parts by mass of the photocatalyst particles, the inorganic oxide particles and the hydrolyzable silicone. Since the proportion of the photocatalyst particles is set to be low as described above, direct contact of the photocatalyst particles with the substrate is reduced as much as possible, thus suppressing corrosion of the substrate (in particular the organic material). As a result, it is supposed that the weather resistance is also improved. Nevertheless, the functions of the noxious gas decomposability and the ultraviolet absorptivity to be caused by photocatalyst activity can be also effectively exhibited.

According to a preferred aspect of the present invention, titania may be added to the photocatalyst layer or the photocatalyst coating liquid, together with at least one metal selected from the group consisting of vanadium, iron, cobalt, nickel, palladium, zinc, ruthenium, rhodium, lead, copper, silver, platinum and gold and/or a metallic compound of these metals, in order to improve the photocatalytic ability. This addition can be conducted in accordance with either a method of adding a solution containing a photocatalyst and the above-described metal or metallic compound as it is or a method of using the photocatalysis redox reaction to allow the metal or metallic compound to be supported on the photocatalyst.

The inorganic oxide particles employed in the present invention is not particularly limited as long as they are capable of being combined with the photocatalyst particles to form a layer, and any type of inorganic oxide particles may be employed. Examples of such inorganic oxide particles include particles of a single oxide such as silica, alumina, zirconia, ceria, yttria, boronia, magnesia, calcia, ferrite, amorphous titania and hafnia; and particles of a composite oxide such as barium titanate and calcium silicate, preferably silica particles. These inorganic oxide particles preferably are in an aqueous colloid form with water as a dispersion medium or in an organosol form of a colloidal dispersion in a hydrophilic solvent such as ethyl alcohol, isopropyl alcohol or ethylene glycol, and colloidal silica is particularly preferable. According to a preferred aspect of the present invention, the average particle size of the inorganic oxide particles is preferably 10 nm or more and less than 40 nm, more preferably 10 nm to 30 nm. The average particle size is calculated as a number average value obtained by measuring the lengths of 100 particles randomly selected from the particles located within a visible field magnified 200,000 times by a scanning electron microscope. The most suitable shape of the particle is a perfect sphere, but an approximately round or elliptical particle may be employed, in which case the length of the particle is approximately calculated as ((long diameter+short diameter)/2). Within this range, the weather resistance, the noxious gas decomposability, and the desired coating properties (such as ultraviolet absorptivity, transparency and film strength) are effectively exhibited. In particular, it is also possible to produce a transparent photocatalyst layer with especially high adhesion.

The content of the inorganic oxide particles in the photocatalyst layer or the coating liquid of the present invention is 70 parts or more and less than 99 parts by mass, preferably 80 parts to 95 parts by mass, more preferably 85 parts to 95 parts by mass, further preferably 90 parts to 95 parts by mass, with respect to the total 100 parts by mass of the photocatalyst particles, the inorganic oxide particles and the hydrolyzable silicone.

The photocatalyst layer of the present invention preferably is substantially free from the hydrolyzable silicone, more preferably completely free from the hydrolyzable silicone. The hydrolyzable silicone is a generic name for organosiloxane having an alkoxy group and/or a partial hydrolysis condensate of the organosiloxane. However, the hydrolyzable silicone may be added as an optional component to such a level that the noxious gas decomposability of the present invention can be ensured. Accordingly, the hydrolyzable silicone content is, on a silica basis, zero parts or more and less than 10 parts by mass, preferably 5 parts or less by mass, most preferably zero parts by mass, with respect to the total 100 parts by mass of the photocatalyst particles, the inorganic oxide particles and the hydrolyzable silicone. A tetrafunctional silicone compound is frequently used as a hydrolyzable silicone, and is commercially available, for example, as ethylsilicate 40 (oligomer, R is an ethyl group), ethylsilicate 48 (oligomer, R is an ethyl group), methylsilicate 51 (oligomer, R is methyl group), all of which are produced by Colcoat Co. Ltd.

The surfactant usable in the present invention may be added to the photocatalyst layer in an amount of zero parts or more by mass and less than 10 parts by mass as an optional component, preferably zero parts to 8 parts by mass, more preferably zero parts to 6 parts by mass. One of the effects of the surfactant is the leveling properties to the substrate. Therefore, the amount of surfactant may be appropriately determined within the aforementioned range, depending on a combination of the coating liquid and the substrate. In this case, the lower limit of the content of the surfactant may be 0.1 parts by mass. The surfactant is a component effective for improving the coating properties of the photocatalyst coating liquid. In the photocatalyst layer formed after being coated, however, the surfactant corresponds to unavoidable impurities which do not contribute to the benefits provided by the photocatalyst-coated body of the present invention. Accordingly, the surfactant can be employed within in the above content range depending on coating properties required for the photocatalyst coating liquid. If coating properties are not considered, substantially no or completely no surfactant may be comprised. A surfactant to be used may be suitably chosen in view of dispersion stability of photocatalyst or inorganic oxide particles or coating properties when the coating is applied to an intermediate layer. Preferred examples of the surfactant include nonionic surfactants, more preferably ether-type nonionic surfactants, ester-type nonionic surfactants, poly-alkylene glycol-type nonionic surfactants, fluorinated nonionic surfactants, and silicon-based nonionic surfactants.

The photocatalyst coating liquid of the present invention can be obtained by dispersing the photocatalyst particles, the inorganic oxide particles, and optionally the hydrolyzable silicone and the surfactant, into a solvent in the aforementioned specific proportion. Any type of solvent may be employed in which the above-described constituents can be appropriately dispersed, and may be water or an organic solvent. The solid concentrations of the photocatalyst coating liquid of the present invention are not particularly limited, but is preferably 1 mass % to 10 mass % for coating easily. Analysis of the constituents in the photocatalyst composition can be conducted by using ultrafiltration to separate the coating liquid into particle components and a filtrate to be respectively analyzed in infrared spectroscopic analysis, gel permeation chromatography, X-ray fluorescence spectrochmeical analysis or the like for spectral analysis.

Manufacturing Process

The photocatalyst-coated body of the present invention can be readily manufactured by applying the photocatalyst coating liquid of the present invention to the substrate. Application of the photocatalyst layer can be conducted in accordance with conventional methods, which includes brush application, roller, spraying, roll coater, flow coater, dip coating, screen printing, electrolytic deposition, vapor deposition, and the like. The coating liquid after applied to the substrate may be dried at room temperature or, if needed, may be dried by heating. Since the photocatalyst layer of the photocatalyst-coated body of the present invention is less likely to corrode organic materials, which are vulnerable to photocatalyst activity, it is possible to use a photocatalyst layer alone without an intermediate layer to produce a photocatalyst-coated body having the superior functions. It is therefore possible to save time and cost required for manufacturing photocatalyst-coated bodies due to no necessity to form the intermediate layer.

EXAMPLES

The present invention will be described in detail with reference to the following Examples, but the present invention is not limited to these Examples.

The raw materials used to produce a photocatalyst coating liquid in the following Examples will be described below.

Photocatalyst Particles

Titania aqueous dispersion (average particle diameter: 30 nm to 60 nm, basic)

Inorganic Oxide Particles

Aqueous dispersion-type colloidal silica (produced by Nissan Chemical Industrials Ltd., trade name: SNOWTEX 50, particle diameter: 20 nm to 30 nm, solids content: 48%) (used in Examples 1 to 19 and Examples 24 to 27)

Aqueous dispersion-type colloidal silica (produced by Nissan Chemical Industrials Ltd., trade name: SNOWTEX 40, particle diameter: 10 nm to 20 nm, solids content: 40%) (used in Example 20)

Aqueous dispersion-type colloidal silica (produced by Nissan Chemical Industrials Ltd., trade name: SNOWTEX 50, particle diameter: 20 nm to 30 nm, solids content: 48%) (used in Example 21)

Aqueous dispersion-type colloidal silica (produced by Nissan Chemical Industrials Ltd., trade name: SNOWTEX S, particle diameter: 8 nm to 11 nm, solids content: 30%) (used in Example 22)

Aqueous dispersion-type colloidal silica (produced by Nissan Chemical Industrials Ltd., trade name: SNOWTEX XS, particle diameter: 4 nm to 6 nm, solids content: 20%) (used in Example 23)

Hydrolyzable Silicone

Polycondensate of tetramethoxysilane (produced by Tama Chemicals Co., Ltd., trade name: M silicate 51)

Surfactant

Polyether modified silicone surfactant (produced by Shin-Etsu Chemical Co., Ltd., trade name: silicone-modified polyether (KF-643))

Examples 1-7

Evaluation of Weather Resistance

A photocatalyst-coated body having a photocatalyst layer was produced as follows. A colored organic coated body was prepared as a substrate. The colored organic coated body was obtained by coating a float plate glass with a general-purposed acrylic silicone with a carbon black powder added, and then sufficiently drying and curing it. On the other hand, a photocatalyst coating liquid was prepared by mixing a titania aqueous dispersion as a photocatalyst, an aqueous dispersion-type colloidal silica as an inorganic oxide, water as a solvent, and a polyether-modified silicone surfactant all together in the proportions shown in Table 1. It should be noted that the photocatalyst coating liquid does not include the hydrolyzable silicone. The total solid concentration of the photocatalyst and the inorganic oxide in the photocatalyst coating liquid was 5.5% by mass.

The photocatalyst coating liquid thus obtained was applied, by spray coating, to the colored organic coated body which has been previously heated to 50° C. The photocatalyst coating liquid was then dried for 5 minutes at 120° C. In this way, a photocatalyst layer was formed to obtain a photocatalyst-coated body. When the film thickness of the photocatalyst layer was measured with a scanning electron microscope, the film thickness was about 0.5 μm in each of Examples 1 to 7.

A weathering test was conducted on the photocatalyst-coated body thus obtained with the size of 50 mm×100 mm as described below. The photocatalyst-coated body was placed in a sunshine weather meter (produced by SUGA TEST INSTRUMENTS CO., LTD., S-300C) in accordance with JIS B7753. After a lapse of 300 hours, a test piece was taken out to measure a color difference before and after the accelerated test with Color Meter ZE2000 produced by Nippon Denshoku Instruments Co., Ltd. The values Δb of the measurement were compared to evaluate the degree of color change.

The results are shown in Table 1 and FIG. 1, in which "G" means that the color showed little change and "NG" means that the values Δb became positive (yellow discoloration). As shown in Table 1 and FIG. 1, it has been found that the photocatalyst-coated body has sufficient weather resistance by setting the photocatalyst content in the photocatalyst layer to less than 20 parts by mass, preferably 15 parts or less by mass, even when the photocatalyst layer is formed on the organic substrate.

TABLE 1

| Example No. | Titanium oxide particles (part by mass) | Silica particles (part by mass) | Surfactant (part by mass) | Δb |
|---|---|---|---|---|
| 1 | 1 | 99 | 6 | G |
| 2 | 5 | 95 | 6 | G |
| 3 | 10 | 90 | 6 | G |
| 4 | 15 | 85 | 6 | G |
| 5 | 18 | 82 | 6 | G |
| 6* | 20 | 80 | 6 | NG |
| 7* | 30 | 70 | 6 | NG |

*Comparative Examples

Examples 8-11

Evaluation of Noxious Gas Decomposability

A photocatalyst-coated body having a photocatalyst layer was produced as follows. A colored organic coated body was prepared as a substrate. The colored organic coated body was obtained by coating a float plate glass with a general-purposed acrylic silicone with carbon black powder added, and then sufficiently drying and curing it. On the other hand, a photocatalyst coating liquid was prepared by mixing a titania aqueous dispersion as a photocatalyst, an aqueous dispersion-type colloidal silica as an inorganic oxide, water as a solvent, a polyether-modified silicone surfactant, and a polycondensate of tetramethoxysilane as a hydrolyzable silicone all together in the proportions shown in Table 2. It should be noted that the photocatalyst coating liquids in Examples 8 and 10 do not include the hydrolyzable silicone. The total solid concentration of the photocatalyst and the inorganic oxide in the photocatalyst coating liquid was 5.5% by mass.

The photocatalyst coating liquid thus obtained was applied, by spray coating, to the colored organic coated body which has been previously heated to 50° C. The photocatalyst coating liquid was then dried for 5 minutes at 120° C. In this way, a photocatalyst layer was formed to obtain a photocatalyst-coated body. When the film thickness (μm) of the photocatalyst layer was measured with a scanning electron microscope, the film thickness was about 1 μm in each of Examples 8 to 11.

A gas decomposition test was conducted on the photocatalyst-coated body thus obtained with the size of 50 mm×100 mm as described below. As a pretreatment, the photocatalyst-coated body was irradiated with BLB light at 1 mW/cm$^2$ for 12 hours or more. The coated body sample was placed in a reactor in accordance with JIS R1701. Air adjusted to 50% RH at 25° C. was mixed with NO gas to a level about 1000 ppb, and was introduced to the light-shielded reactor for 20 minutes. With the gas being introduced, the BLB light was applied at 3 mW/cm$^2$ for 20 minutes. The reactor was then shielded from light again in a condition where the gas is introduced. The amount of NOx removed was calculated from the NO concentrations and the NO$_2$ concentrations before and after the irradiation with the BLB light, in accordance with the following equation:

The amount of NOx removed=[NO(after BLB irradiation)−NO(at BLB irradiation)]−[NO$_2$(at BLB irradiation)−NO$_2$(after BLB irradiation)]

The results are shown in Table 2, in which "G" means that the amount of NOx removed is 400 ppb or more and "NG" means that the amount of NOx removed is 10 ppb or less. As shown in Table 2, it has been found that satisfactory NOx decomposition was demonstrated by the photocatalyst layer comprising the photocatalyst particles and the inorganic oxide and being substantially free from the hydrolyzable silicone. On the other hand, it has been found that the photocatalyst layer comprising 10 parts by mass of the hydrolyzable silicone lost NOx decomposability.

TABLE 2

| Ex. | Titanium oxide particles (PBM) | Silica particles (PBM) | Hydrolyzable silicone (PBM) | Surfactant (PBM) | NOx removal amount |
|---|---|---|---|---|---|
| 8 | 10 | 90 | 0 | 6 | G (461 ppb) |
| 9* | 10 | 80 | 10 | 6 | NG (2 ppb) |
| 10 | 15 | 85 | 0 | 6 | G (532 ppb) |
| 11 | 15 | 80 | 5 | 6 | G (441 ppb) |

PBM: Part by mass
*Comparative Example.

Examples 12-19

Measurement of Linear Transmittance and UV Shielding Rate

A photocatalyst-coated body having a photocatalyst layer was produced as follows. A float plate glass of 94% transmittance at the wavelength of 550 nm was prepared as a substrate. On the other hand, a photocatalyst coating liquid was prepared by mixing a titania aqueous dispersion as a photocatalyst, an aqueous dispersion-type colloidal silica as an inorganic oxide having an average particle diameter ranging from 20 nm to 30 nm, water as a solvent, and a polyether-modified silicone surfactant all together in the proportions shown in Table 3. It should be noted that the photocatalyst coating liquid does not include the hydrolyzable silicone. The total solid concentration of the photocatalyst and the inorganic oxide in the photocatalyst coating liquid was 5.5% by mass.

The photocatalyst coating liquid thus obtained was applied, by spray coating, to the colored organic coated body which has been previously heated to 50° C. The photocatalyst coating liquid was then dried for 5 minutes at 120° C. In this way, a photocatalyst layer was formed to obtain a photocatalyst-coated body. When the film thickness (μm) of the photocatalyst layer was measured with a scanning electron microscope, values were obtained as shown in Table 3.

Measurements of linear transmittance at 550 nm and ultraviolet (300 nm) shielding rate were conducted on a photocatalyst-coated body with the size of 50 mm×100 mm as described below by use of an UV/VIS/NIR spectrophotometer (produced by Shimadzu Corporation, UV-3150).

Figure 2:
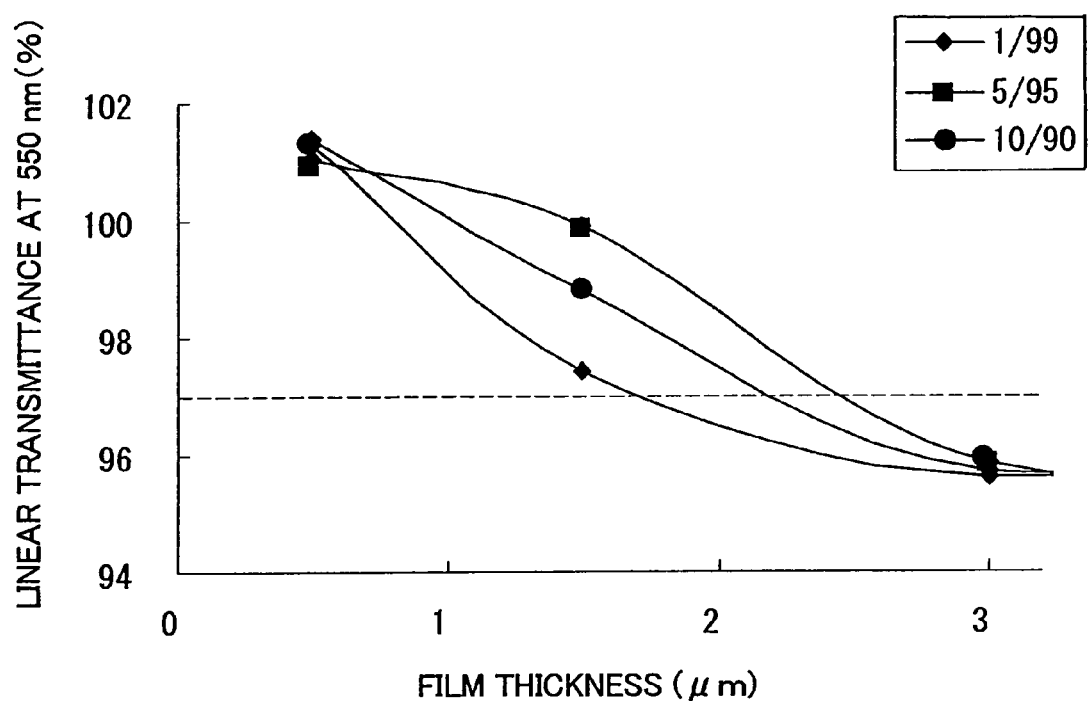
FIG. 2 is a graph showing the relationship between the linear transmittance at 550 nm (%) and the film thickness (μm), measured in Examples 12 to 19, in which the ratios of 1/99, 5/95, 10/90 represent the titanium-particle/silica-particle mass ratio.
Figure 3:
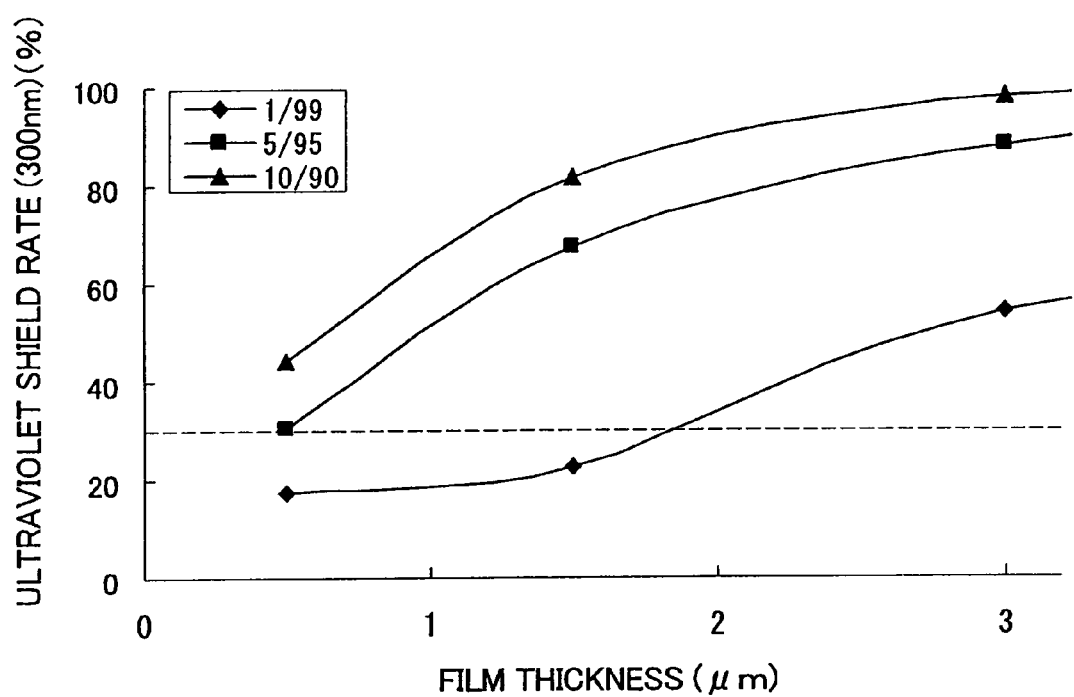
FIG. 3 is a graph showing the relationship between the ultraviolet (300 nm) shield rate (%) and the film thickness (μm), measured in Examples 12 to 19, in which the ratios of 1/99, 5/95, 10/90 represent the titanium-particle/silica-particle mass ratio.

The results are shown in Table 3 and FIGS. 2 and 3. Evaluation on linear transmittance and ultraviolet shielding rate was conducted according to the following criteria.

<Linear Transmittance>
A: linear transmittance at 550 nm is 97% or more
B: linear transmittance at 550 nm is 95% or more and less than 97%
C: linear transmittance at 550 nm is less than 95%

<UV Shielding Rate>
A: UV (300 nm) shielding rate is 80% or more
B: UV (300 nm) shielding rate is 30% or more and less than 80%
C: UV (300 nm) shielding rate is less than 30%

As shown in Table 3, FIG. 2 and FIG. 3, it has been found that it is possible to sufficiently shield the ultraviolet, which causes degradation of the organic substance, and to ensure transparency, by setting the film thickness to 3 μm or less when the content of the photocatalyst in the photocatalyst layer ranges from 5 parts to 15 parts by mass.

TABLE 3

| Ex. | Titanium oxide particles (PBM) | Silica particles (PBM) | Sur- factant (PBM) | Film thickness (μm) | Linear transmittance (550 nm) | UV shielding rate (300 nm) |
|---|---|---|---|---|---|---|
| 12 | 5 | 95 | 6 | 0.5 | A | B |
| 13 | 5 | 95 | 6 | 1.5 | A | B |
| 14 | 10 | 90 | 6 | 0.5 | A | B |
| 15 | 10 | 90 | 6 | 1.5 | A | A |
| 16 | 5 | 95 | 6 | 3 | B | A |
| 17 | 10 | 90 | 6 | 3 | B | A |
| 18 | 1 | 99 | 6 | 0.5 | A | C |
| 19 | 1 | 99 | 6 | 1.5 | A | C |

PBM: Part by mass

Examples 20-23

Measurement of Haze

A photocatalyst-coated body having a photocatalyst layer was produced as follows. A float plate glass of 94% transmittance at the wavelength of 550 nm was prepared as a substrate. On the other hand, a photocatalyst coating liquid was prepared by mixing a titania aqueous dispersion as a photocatalyst, an aqueous dispersion-type colloidal silica as an inorganic oxides having various average particle diameters shown in Table 4, water as a solvent, and a polyether-modified silicone surfactant all together in the proportions shown in Table 4. It should be noted that the photocatalyst coating liquid does not comprise the hydrolyzable silicone. The total solid concentration of the photocatalyst and the inorganic oxide in the photocatalyst coating liquid was 5.5% by mass.

The photocatalyst coating liquid thus obtained was applied to the above-described substrate by spin coating at 1000 rpm for 10 seconds, and then dried for 5 minutes at 120° C. to form a photocatalyst layer. Haze was measured on a photocatalyst-coated body with the size of 50 mm×100 mm thus obtained by use of a haze meter (produced by Gardner Corporation, hazegard plus).

The results are shown in Table 4. As shown in Table 4, it has been found the haze value can be reduced to less than 1% so that transparency can be ensured, by setting the particle diameter of the metallic oxide particles in the photocatalyst layer to 10 nm to 30 nm.

TABLE 4

| Ex. | Titanium oxide particles (PBM) | Silica particles (PBM) | Silica particle diameter (nm) | Surfactant (PBM) | Haze (%) |
|---|---|---|---|---|---|
| 20 | 10 | 90 | 10-20 | 6 | 0.68 |
| 21 | 10 | 90 | 20-30 | 6 | 0.48 |
| 22 | 10 | 90 | 8-11 | 6 | 1.11 |
| 23 | 10 | 90 | 4-6 | 6 | 1.22 |

PBM: Part by mass

Examples 24-27

Evaluation of Influence by Surfactant Addition

A photocatalyst-coated body having a photocatalyst layer was produced as follows. A colored organic coated body was prepared as a substrate. The colored organic coated body was obtained by coating a float plate glass with a general-purposed acrylic silicone with a carbon black powder added, and then sufficiently drying and curing it. On the other hand, a photocatalyst coating liquid was prepared by mixing a titania aqueous dispersions as a photocatalyst, an aqueous dispersion-type colloidal silica as an inorganic oxide, water as a solvent, and a polyether-modified silicone surfactant all together in the proportions shown in Table 5. It should be noted that the photocatalyst coating liquid does not comprise the hydrolyzable silicone. The total solid concentration of the photocatalyst and the inorganic oxide in the photocatalyst coating liquid was 5.5% by mass.

The photocatalyst coating liquid thus obtained was applied, by spray coating, to the colored organic coated body which has been previously heated to 50° C. to 60° C. The photocatalyst coating liquid was dried for 5 minutes at 120° C. In this way, a photocatalyst layer was formed to obtain a photocatalyst-coated body. When the film thickness (μm) of the photocatalyst layer was measured with a scanning electron microscope, the film thickness was about 1 μm in each of Examples 24 to 27.

A gas decomposition test was conducted on the photocatalyst-coated body thus obtained with the size of 50 mm×100 mm as described below. As a pretreatment, the photocatalyst-coated body was irradiated with BLB light at 1 mW/cm$^2$ for 12 hours or more. The coated body sample was placed in a reactor in accordance with JIS R1701. Air adjusted to 50% RH at 25° C. was mixed with NO gas to a level about 1000 ppb, and was introduced to the light-shielded reactor for 20 minutes. With the gas being introduced, the BLB light was applied at 3 mW/cm$^2$ for 20 minutes. The reactor was then shielded from light again in a condition where the gas is introduced. The amount of NOx removed was calculated from the NO concentrations and the $NO_2$ concentrations before and after the irradiation with the BLB light, in accordance with the following equation:

The amount of NOx removed=[NO (after BLB irradiation)−NO (at BLB irradiation)]−[$NO_2$ (at BLB irradiation)−$NO_2$ (after BLB irradiation)]

The results are shown in Table 5, in which the NOx removal efficiencies are shown relatively to the removal efficiency 100 in Example 25. As shown in Table 5, it has been found that increasing the amount of the surfactant leads to reduction in removal efficiency.

TABLE 5

| Ex. | Titanium oxide particles (PBM) | Silica particles (PBM) | Surfactant (PBM) | NOx removal efficiencies (Ex. 25 is 100) |
|---|---|---|---|---|
| 24 | 10 | 90 | 0 | 98 |
| 25 | 10 | 90 | 6 | 100 |
| 26* | 10 | 90 | 10 | 85 |
| 27* | 10 | 90 | 33.3 | 79 |

PBM: Part by mass.

Although there have been described what are the present embodiments of the invention, it will be understood that variations and modifications may be made thereto within the scope of the claims appended hereto.

The invention claimed is:

1. A photocatalyst-coated body comprising a substrate and a photocatalyst layer provided on the substrate, the photocatalyst layer comprising:
   photocatalyst particles of 1 part or more by mass and less than 20 parts by mass;
   inorganic oxide particles of 70 parts or more by mass and less than 99 parts by mass; and
   a dried substance of a hydrolyzable silicone in terms of silica of zero parts or more by mass and less than 10 parts by mass,
   provided that a total amount of the photocatalyst particles, the inorganic oxide particles and the dried substance of the hydrolyzable silicone in terms of silica is 100 parts by mass,
   wherein the substrate has at least a surface comprising an organic material.

2. The photocatalyst-coated body according to claim 1, wherein the photocatalyst layer has a film thickness ranging from 0.5 μm to 3.0 μm.

3. The photocatalyst-coated body according to claim 1, wherein the photocatalyst layer is substantially free from the hydrolyzable silicone.

4. The photocatalyst-coated body according to claim 1, wherein the photocatalyst layer further comprises a surfactant of zero parts or more by mass and less than 10 parts by mass.

5. The photocatalyst-coated body according to claim 1, wherein the photocatalyst layer comprises the photocatalyst particles of 5 parts to 15 parts by mass.

6. The photocatalyst-coated body according to claim 1, wherein the photocatalyst particles are titanium oxide particles.

7. The photocatalyst-coated body according to claim 1, wherein the inorganic oxide particles are silica particles.

8. The photocatalyst-coated body according to claim 1, wherein the inorganic oxide particles have a number average particle diameter ranging from 10 nm or more to less than 40 nm calculated by measuring lengths of 100 particles randomly selected from particles located within a visible field magnified 200,000 times by a scanning electron microscope.

9. The photocatalyst-coated body according to claim 1, wherein the photocatalyst layer is applied directly on the substrate.

10. The photocatalyst-coated body according to claim 1, wherein the photocatalyst-coated body is used as an exterior material.

11. A photocatalyst coating liquid used for manufacturing the photocatalyst-coated body according to claim 1, comprising, in a solvent,
    photocatalyst particles of 1 part or more by mass and less than 20 parts by mass;
    inorganic oxide particles of 70 parts or more by mass and less than 99 parts by mass; and
    a hydrolyzable silicone in terms of silica of zero parts or more by mass and less than 10 parts by mass,
    provided that the total amount of the photocatalyst particles, the inorganic oxide particles and the hydrolyzable silicone in terms of silica is 100 parts by mass.

12. The photocatalyst coating liquid according to claim 11, being substantially free from the hydrolyzable silicone.

13. The photocatalyst coating liquid according to claim 11, further comprising a surfactant of zero parts or more by mass and less than 10 parts by mass.

14. The photocatalyst coating liquid according to claim 11, comprises the photocatalyst particles of 5 parts to 15 parts by mass.

15. The photocatalyst coating liquid according to claim 11, wherein the photocatalyst particles are titanium oxide particles.

16. The photocatalyst coating liquid according to claim 11, wherein the inorganic oxide particles are silica particles.

17. The photocatalyst coating liquid according to claim 11, wherein the inorganic oxide particles have a number average particle diameter ranging from 10 nm or more to less than 40 nm calculated by measuring lengths of 100 particles randomly selected from particles located within a visible field magnified 200,000 times by a scanning electron microscope.

18. The photocatalyst coating liquid according to claim 11, wherein the photocatalyst coating liquid is used for applying a coating to a substrate having at least a surface comprising an organic material.

19. The photocatalyst coating liquid according to claim 18, wherein the photocatalyst coating liquid is applied directly on the substrate.

20. The photocatalyst coating liquid according to claim 11, wherein the photocatalyst coating liquid is used for coating an exterior material.

* * * * *